United States Patent [19]
Stangeland

[11] Patent Number: 5,852,412
[45] Date of Patent: Dec. 22, 1998

[54] DIFFERENTIAL GROUND STATION REPEATER

[75] Inventor: Rodney L. Stangeland, Plymouth, Minn.

[73] Assignee: Honeywell Inc.

[21] Appl. No.: 550,488

[22] Filed: Oct. 30, 1995

[51] Int. Cl.[6] .................................................. G08B 1/123
[52] U.S. Cl. .......................... 340/988; 340/945; 342/357; 701/66; 701/215
[58] Field of Search ..................................... 340/988, 945; 342/357; 364/449, 460; 701/66, 215

[56] References Cited

U.S. PATENT DOCUMENTS

| | | | |
|---|---|---|---|
| 4,083,009 | 4/1978 | Bickford et al. | 325/304 |
| 4,809,005 | 2/1989 | Counselman, III | 342/352 |
| 4,894,655 | 1/1990 | Joguet et al. | 340/988 |
| 5,345,245 | 9/1994 | Ishikawa et al. | 342/357 |
| 5,361,212 | 11/1994 | Class et al. | 364/428 |
| 5,436,632 | 7/1995 | Sheynblat | 342/357 |
| 5,438,337 | 8/1995 | Aguado | 342/357 |

FOREIGN PATENT DOCUMENTS

| | | | |
|---|---|---|---|
| 9410582 | 11/1994 | WIPO | G01S 5/14 |
| 9515499 | 8/1995 | WIPO | G01S 5/02 |

OTHER PUBLICATIONS

Article entitled "Interference Detection and Suppression in Loran–C Receivers" by M. Beckmann, Msc from IEE Proceedings, vol. 136, Pt. F, No. 6, Dec. 1989 (pp. 255–261).

Application entitled "Differential Ground Station Repeater" by Randolph G. Hartman, filed Mar. 7, 1995 serial #08/400,168.

Document entitled "Minimum Aviation System Performance Standards DGNNSS Instrument Approach System" Special Category I (SCAT–I) Appendix F Change No. 1 to RTCA/DO–217 of Jul. 13, 1994.

Article entitled The GNSS Transponder and It's GNSS–Time Synchronized Self Organizing TDMA Data Link: The Next Data Link for Civil Aviation? published in the Journal of Air traffic Control, Apr.–Jun. 1994 issue, pp. 17–23.

Mr. Johnny Nilsson from Sweden GNSS Transponder and the Time Synchronized Self Organizing TDMA Data Link – A Key to the Implementation of Cost–Effectove GNSS–Based CNS/ATM Systems published Oct. 30, 1994 pp. 489–497.

*Primary Examiner*—Jeffrey Hofsass
*Assistant Examiner*—Benjamin C. Lee
*Attorney, Agent, or Firm*—Charles J. Ungemach

[57] ABSTRACT

A differential global position system wherein a DGPS ground station encodes signals from a plurality of satellites and transmits the encoded signal with satellite-specific pseudo range error signals and a ground station repeaters located remote from the DGPS ground station to receive the encoded signal and retransmit it to an airborne object.

15 Claims, 2 Drawing Sheets

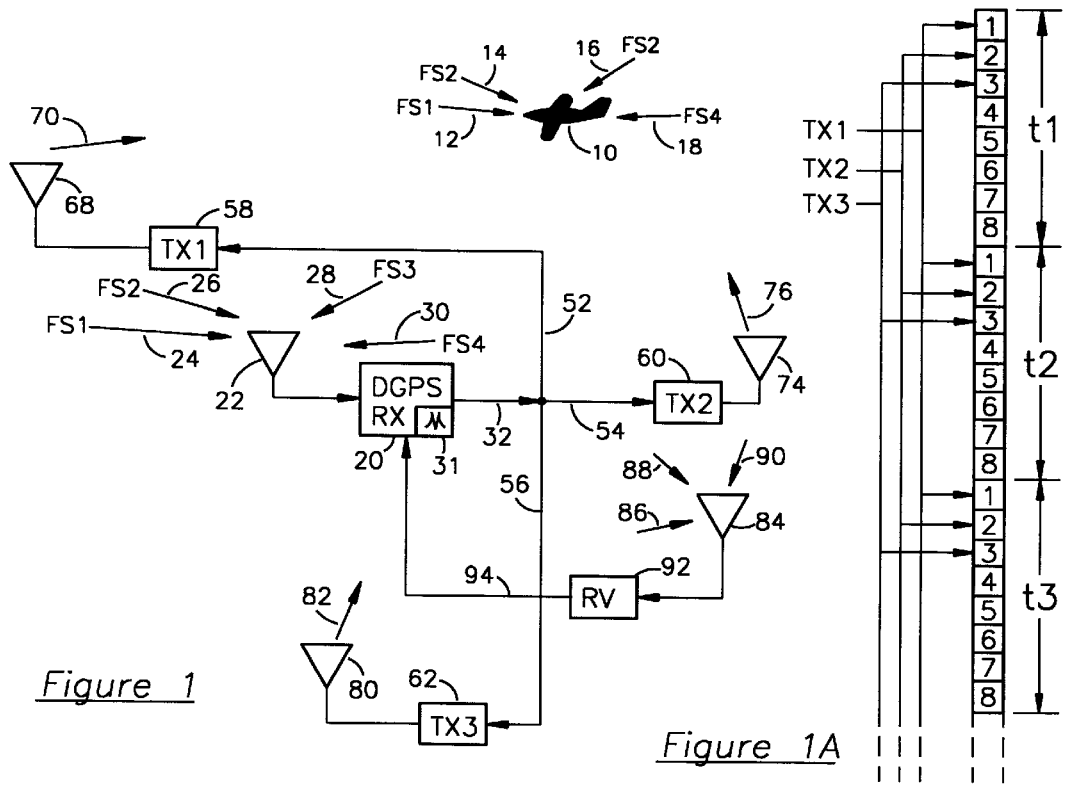
*Figure 1*
*Figure 1A*
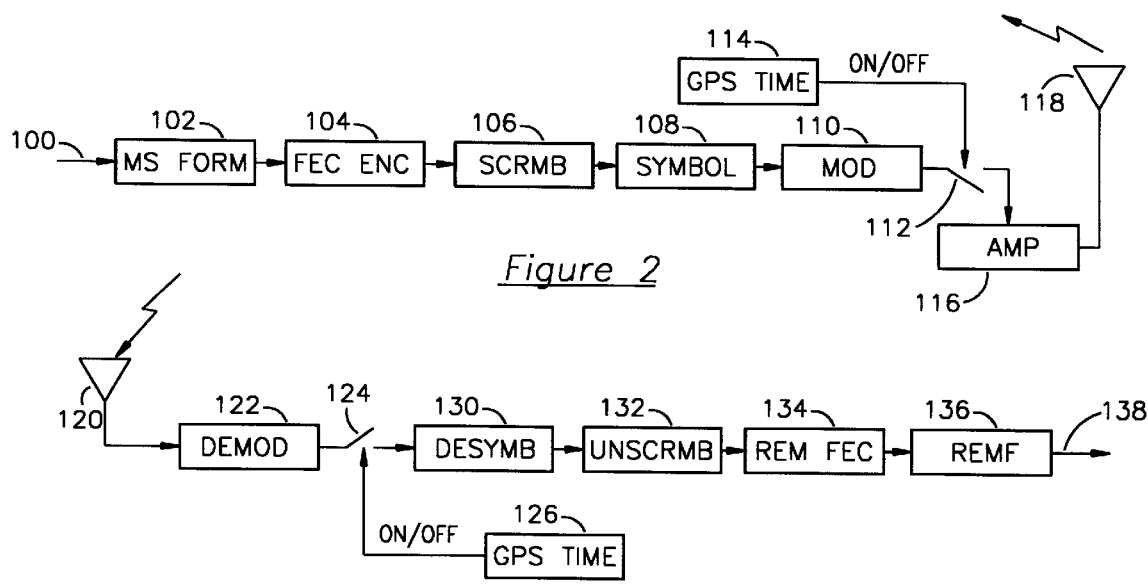
*Figure 2*
*Figure 3*

DIFFERENTIAL GROUND STATION REPEATER

BACKGROUND OF THE INVENTION

1. FIELD OF THE INVENTION

The present invention relates to an enhancement of Radio Frequency (RF) transmitters by using RF repeaters in conjunction with Time Division Multiple Access (TDMA) techniques. Such an invention can be used with a Differential Global Positioning System (DGPS) which utilizes signals from a plurality of satellites to determine various parameters of aircraft operation such as position, attitude, velocity and the rates of change of these parameters and which provide correction information for satellite specific pseudo range errors.

2. CROSS REFERENCE TO RELATED APPLICATIONS

In an application entitled "Differential Ground Station Repeater", filed by Randolph G. Hartman, Mar. 7, 1995, Ser. No. 08/400,168 and assigned to the assignee of the present invention a DGPS system is shown which permits a single receiver and processor to provide information to a plurality of transmitters so as to reduce problems with frequency congestion, lack of range and obstruction due to surrounding structures. FIG. 1 shows a system similar to that of the Hartman application. In FIG. 1, an aircraft 10 is shown receiving signals from four satellites FSI, FS2, FS3 and FS4 over paths shown by arrows 12, 14, 16 and 18. ADGPS receiver 20 is shown at a fixed and known location and having a receiving antenna 22 receiving information from the satellites FS1, FS2, FS3 and FS4 over paths such as shown by arrows 24, 26, 28 and 30. DGPS receiver 20 includes a microprocessor 31 which calculates the satellite-specific pseudo range error signals and transmits this information over a line shown as arrow 32 and by lines shown by arrows 52, 54 and 56 to remotely located transmitters TX1, TX2, and TX3 shown by boxes 58, 60 and 62 respectively. Transmission lines 52, 54 and 56 may be hardwired, may be fiber optic or may be radio links whichever is most convenient under the circumstances. The remote transmitters 58, 60, and 62 may all be located at a single airport so as to provide unobscured vision of all of the aircraft from various angles to insure ground coverage or may be located at various airports around the general area to insure regional coverage. For example, if the range of transmission of the transmitters is considered to be 100 miles and if there are three large airports within that area, transmitter 58 may be located at the first of such airports, transmitter 60 may be located at the second of such airports and transmitter 62 may be located at the third of such airports. To avoid obscuration problems at the individual airports two or more transmitters may be positioned at the airport so that the chances of both being simultaneously obscured is made substantially impossible. As was described in the Hartman application, the signals transmitted by the transmitters 58, 60 and 62 will be transmitted in different time slots at the same frequency. This can be seen in FIG. 1a showing three time slots $t_1$, $t_2$, and $t_3$, each divided into 8 subslots. The time slots are synchronized to GPS time to allow all users to independently determine appropriate time slots. The first transmitter TX1 transmits its information only during the sub-time slot 1 in each period of transmission while transmitter TX2 transmits its information to the aircraft only during sub-time slot 2 of each transmission period and transmitter TX3 transmits its information only during the sub-time slot 3 of each transmission period. Obviously with eight sub-periods five more transmitters could be utilized in this system with all of them broadcasting on the same frequency and the aircraft avoiding confusion by knowing which transmitter is using which sub-time slot.

Transmitters TX1, TX2 and TX3 each modify or encode the signals from the microprocessor 34 as will be described in connection with FIG. 2 so that they meet governmental requirements for transmissions between ground and airborne subsystems and to reduce the possibility of contamination of the signals. Transmitter 58, utilizing an antenna 68, transmits the properly formatted satellite-specific pseudo range error information to the aircraft 10 as shown by arrow 70. Similarly, transmitter 60 utilizing an antenna 74 transmits the same information to the aircraft 10 as shown by arrow 76 and transmitter 62 utilizing an antenna 80 transmits the same information to aircraft 10 as shown by arrow 82. All of the antennas 68, 74 and 80 utilize the same frequency but utilize different time slots as described in the Hartman application. Accordingly, aircraft 10 receives signals from any one or all of these sources on a single frequency and can determine which transmitter is sending the signals by the time slot it uses. Thus, the airborne equipment can utilize the information to provide the accurate determination of the aircraft parameters it needs.

In order to provide the data link wraparound, an antenna shown in FIG. 1 as antenna 84 may be located in a position to receive the transmissions from all of the antennas 68, 74 and 80 over paths shown by arrows 86, 88 and 90 respectively. In most cases a single antenna may be used for this purpose but if this is not possible more than one antenna may be employed. The signals received by antenna 84 are presented to a receiver 92 and are transmitted back to the ground station 20 and processor 31 via a connection shown as arrow 94. This feedback signal is referred to as a data link wraparound and is for the purpose of informing the ground station of the exact signal that was sent to the aircraft 10 as a check to make sure that the ground station system is working properly.

One undesirable feature of the above described system is that, as mentioned, each remote transmitter has to independently encode or format the information from the microprocessor 34 for transmission to the aircraft. The formatting which is performed by each of the transmitters is shown in FIG. 2 where a line shown as arrow 100 represents the digitized information from the microprocessor 34. This data is presented to a Message Format box 102 which appends a training sequence that allows proper synchronization and demodulation of the message for use by the aircraft and the wrap around receiver. The modified data is next presented to a Forward Error Correction (FEC) box 104 to improve the effective channel throughput. The resulting data is presented to a Bit Scrambling box 106 to aid in clock recovery. The output of the Bit Scrambling box 104 is presented to a Symbolizing box 108 and then to a Modulator box 110 so that the data will be differentially encoded with an 8 phase shift keying and the resulting RF signal passes through a switch 112 which is controlled to an on/off position by a GPS Time box 114 in order to synchronize the signal to the correct TDMA time slot. After synchronization, the signal is amplified by an amplifier 116 for presentation to an antenna 118 which may be any of the antennas 70, 74 and 80 of FIG. 1. The now properly encoded signal is transmitted to the aircraft 10 from all of the antennas. It is also transmitted to the wraparound antenna 84. The various encoding steps of FIG. 2 are more completely explained in a document Change No. 1 to RTCA/DO-217 entitled "Minimum Aviation System Performance Standards DGNNSS Instrument Approach System: Special Category I (SCAT-I) Appendix F" of Jul.

13, 1994 published by RTCA, INC 1140 Connecticut Avenue, N. W. Suite 1020, Washington D. C. 20036.

The aircraft 10 (and the DGPS receiver 20) then reconstitute the signal as shown in FIG. 3. In FIG. 3, an antenna 120, which may be the aircraft antenna or the wraparound antenna 84, receives the encoded signal from antennas 68, 74 and 80 and presents them to a demodulator box 122 which demodulates the signals and presents them to a switch 124 which is operated to an on or off position by a GPS Timer 126 to again synchronize the signal with the GPS derived TDMA time slot. The resultant signal is sent to a Desymbolizer 130, an Unscrambler 132, a Remove FEC box 134, and a Remove Message Format box 136 to provide the signals for use by the aircraft 10 or DGPS 20 at an output shown as arrow 138.

It is seen that there is a great deal of redundant equipment used in the above described system since each of the transmitters must process the information from the receiver 20 and microprocessor 31 in exactly the same way. Such redundancy is costly and space consuming.

BRIEF DESCRIPTION OF THE PRESENT INVENTION

The present invention proposes that instead of utilizing all of the formatting equipment at each of the transmitter locations, that the formatting of the signals take place at the DGPS Receiver and Processor location and then broadcast to the aircraft and to any repeater station which is desired. The repeater stations need only receive the signal, move it to a different time slot and rebroadcast the signal without further modification.

BRIEF DESCRIPTION OF THE DRAWINGS

FIG. 1 shows the system of the above referred to Hartman application;

FIG. 1a shows the time slot arrangement for transmission;

FIG. 2 shows a block diagram of the formatting of the signal for transmitting to the aircraft;

FIG. 3 shows a block diagram of the deformatting done by the aircraft and the DGPS receiver and processor;

DETAILED DESCRIPTION OF THE PREFERRED EMBODIMENT

Figure 4:
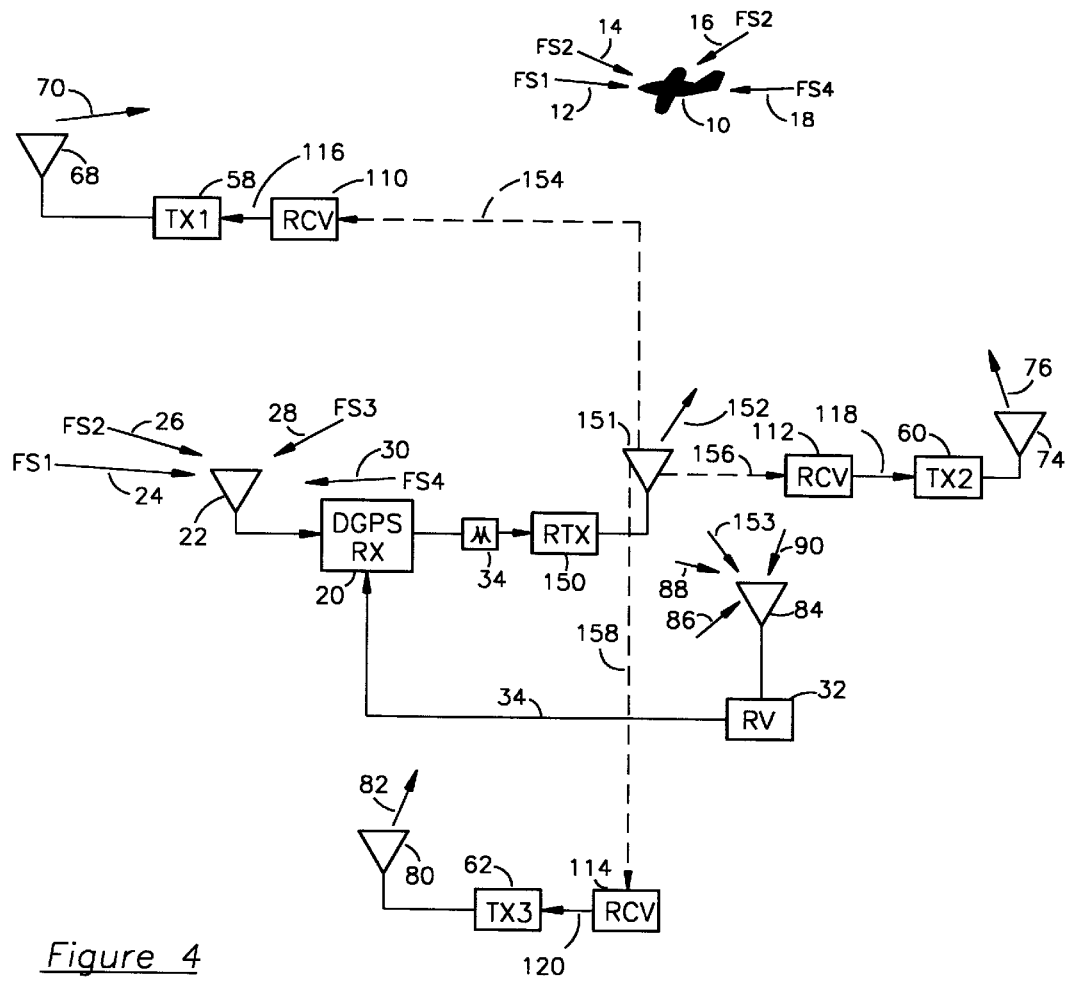
FIG. 4 shows an embodiment of the present invention.

In FIG. 4, the layout is substantially the same as in FIG. 1 except that the output of the DGPS receiver 20 and microprocessor 34 computing system is now shown connected to a local transmitter 150. Transmitter 150 formats the signals from the microprocessor 34 in accordance with the encoding requirements described in connection with FIG. 2 and transmits the encoded signals to an antenna 151 which broadcasts the signal by radio transmission to the aircraft 10 as shown by arrow 152 and to the receivers 110, 112 and 114 as shown by dashed lines 154, 156 and 158. Receivers 110, 112 and 114 present the encoded signals to transmitters 58, 60 and 62 which delay the encoded signal into the proper time slot as will be explained in connection with FIG. 5 and then rebroadcast the encoded signals in the proper time slots to the aircraft 10 as shown by arrows 70, 76 and 82 respectively. Wrap around receiver antenna 84 also receives the signals from antennas 68, 74, 82 and 151 as shown by arrows 88, 90, 86 and 151 respectively and transmits them to the ground station 20 over line 94 so that the broadcast signals can be verified. Antenna 84 is now seen to be proximate or co-located with antenna 151. It is also seen that the DGPS ground station now constitutes a separate transmitter so that in FIG. 4 there are actually 4 separate transmissions to the aircraft. This configuration may be used to support multiple airports or areas that exhibit RF dead spots.

In FIG. 4, the formatting of the signal in accordance with the broadcast requirements is done only once and the formatted signal is sent to the repeater transmitters. In FIG. 4, transmitters 58, 60 and 62 will receive the formatted signal from the ground station 20 and need only to shift it to an appropriate time slot, as described in connection with FIG. 5, and re-broadcast the encoded signals to the aircraft 10 and the wraparound receiver 84 without further modification.

Figure 5:
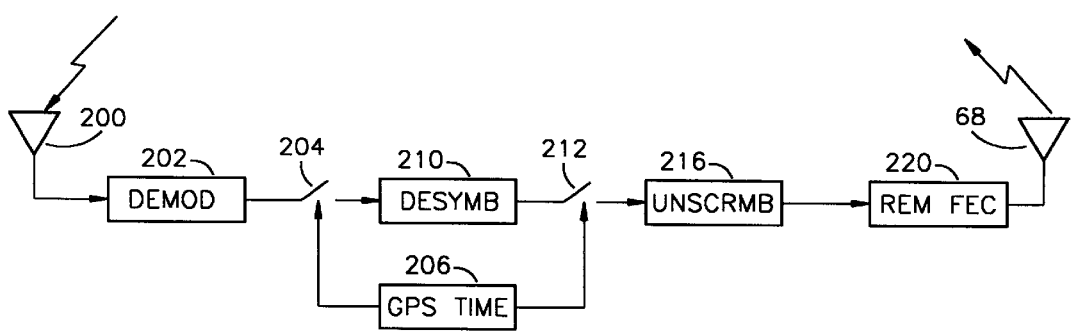
FIG. 5 shows a block diagram of the modified DGPS datalink repeater.

FIG. 5 shows a simplified block diagram for the repeater stations to shift to a different time slot for re-broadcast of the encoded signal. In FIG. 5, an antenna 200 is shown receiving the signal broadcast by the ground station transmitter 150. The signal is modulated and encoded as described in connection with FIG. 2 but must be moved to a different time slot for transmission to the aircraft 10. This is accomplished by demodulating the signal in a demodulator 202, synchronizing the signal to GPS time by a switch 204 controlled by a GPS timer box 206 and presenting the signal to a Time Delay box 210. Time Delay box 210 delays the signal by enough time to put it into a different time slot and then sends the signal through a switch 212 to assure it is still in synchronization with GPS time by control from the GPS Time box 206. Since the input signal was demodulated, it now goes to a Modulator 216 and then to an Amplifier 220 for transmission by an antenna such as antenna 68 of FIG. 4.

It is thus seen that I have provided a ground station repeater for a Differential GPS system which minimizes the number of components needed at the various locations and still retains the advantages of the system of the above described Hartman application.

Many changes to the apparatus described will occur to those skilled in the art. For example, the present invention has been described primarily in connection with a DGPS positioning system while the inventive concepts may be equally employed in other TDMA multiple access transmission systems. Some systems of this kind are described in an article entitled "The GNSS Transponder and Its GNSS-Time Synchronized Self Organizing TDMA Data Link: the Next Data Link for Civil Aviation?" published in The Journal of Air Traffic Control for Apr.-Jun. 1994, pp 17-23. Accordingly, I do not wish to be limited by the specific disclosure used in connection with the preferred embodiments.

The embodiments of the invention in which an exclusive property or right is claimed are defined as follows:

1. A differential global position system for use in determining one or more parameters of an object with respect to earth by use of information transmitted to the object from a plurality of satellites which information may contain errors due to path distortions, comprising:

a ground receiving station at a first known location and including a receiver to receive the information from the satellites and to produce an output signal indicative of the errors;

means located proximate the ground receiving station for encoding the output signal in accordance with requirements for data transmission between the ground receiving station and the object;

a first transmitter located proximate the ground receiving station for broadcasting the encoded output signal to the object; and a second transmitter located at a second position remote from the receiving station to receive the broadcast encoded output signal from the first transmitter and to retransmit it to the object.

2. Apparatus according to claim 1 wherein the first transmitter transmits the encoded output signal in a first time slot and the second transmitter transmits the encoded output signal in a second time slot.

3. Apparatus according to claim 1 wherein the object is an aircraft and the first and second transmitters are located proximate a first airport with the first and second positions chosen to provide the error information to the aircraft free of obscuration by interfering structures.

4. Apparatus according to claim 1 further including a data link wrap around receiving antenna positioned to receive the transmissions from the first and second transmitters and connected to the ground station to feedback the transmission information thereto.

5. Apparatus according to claim 1 wherein the second transmitter includes a demodulator to demodulate the encoded output signal, a time delay to delay the demodulated encoded output signal into the second time slot and a modulator to remodulate the demodulated delayed encoded output signal for transmission to the object.

6. Apparatus according to claim 1 further including a third transmitter located remote from the ground station to receive the encoded output signal from the first transmitter and transmit it to the object.

7. Apparatus according to claim 6 wherein the third transmitter transmits the encoded output signal to the object in a third time slot.

8. A process for use with a differential global position system in which information from a plurality of satellites is received at a ground station and processed to determine any errors therein and the processed information is encoded for transmission to aircraft within transmission range of the ground station, an improvement permitting a single encoding of the processed information comprising the steps of:

A. connecting the ground station to a first transmitter located proximate the ground station to receive the processed and encoded information and transmit it to the aircraft in a first time slot at a frequency;and B. transmitting the processed and encoded information from the first transmitter to a second transmitter located remote from the grounds station for transmission to the aircraft in a second time slot a the same frequency.

9. The process of claim 8 further including the step of positioning the transmitters so that an unobscured transmission to the aircraft is possible from at least one transmitter at all aircraft positions.

10. The process of claim 8 further including the step of monitoring the transmissions of the plurality of transmitters and feeding the transmissions back to the ground station to verify the transmissions to the aircraft.

11. The process of claim 8 wherein Step B includes the steps of:

B1. demodulating the signal from the first transmitter;

B2. time delaying the demodulated signal to the second time slot; and

B3. remodulating the demodulated time delayed signal for transmission to the aircraft in the second time slot.

12. A multiple access transmission system for use in communicating common information to an object from multiple transmitters broadcasting in different time slots, comprising:

a ground receiving station at a first known location operable to produce an encoded output signal in accordance with requirements for data transmission between the ground receiving station and the object;

a first transmitter located proximate the ground receiving station for broadcasting the encoded output signal to the object; and a second transmitter located at a second position remote from the receiving station to receive the broadcast encoded output signal from the first transmitter, to delay it into a proper time slot and to retransmit it to the object wherein the first transmitter transmits the encoded output signal in a first time slot at a frequency and the second transmitter transmits the encoded output signal in the proper time slot at the same frequency. pg,11

13. Apparatus according to claim 12 wherein the ground station is a DGPS receiver and processor which is operable to receive signals and the encoded output signal is indicative of satellite specific pseudo range error signals.

14. Apparatus according to claim 12 wherein the object is an aircraft.

15. Apparatus according to claim 14 wherein the aircraft includes means for receiving the encoded signal and reconstituting it.

\* \* \* \* \*